(12) United States Patent
Cao et al.

(10) Patent No.: US 9,407,827 B2
(45) Date of Patent: Aug. 2, 2016

(54) METHOD AND SYSTEM FOR CAPTURING SEQUENCES OF IMAGES WITH COMPENSATION FOR VARIATIONS IN MAGNIFICATION

(71) Applicant: DXO LABS, Boulogne Billancourt (FR)

(72) Inventors: Frederic Cao, Boulogne-Billancourt (FR); Frederic Guichard, Paris (FR)

(73) Assignee: DXO LABS, Boulogne Billancourt (FR)

( * ) Notice: Subject to any disclaimer, the term of this patent is extended or adjusted under 35 U.S.C. 154(b) by 25 days.

(21) Appl. No.: 14/358,135

(22) PCT Filed: Nov. 13, 2012

(86) PCT No.: PCT/FR2012/052616
§ 371 (c)(1),
(2) Date: May 14, 2014

(87) PCT Pub. No.: WO2013/072618
PCT Pub. Date: May 23, 2013

(65) Prior Publication Data
US 2014/0313374 A1 Oct. 23, 2014

(30) Foreign Application Priority Data
Nov. 14, 2011 (FR) ...................................... 11 60333

(51) Int. Cl.
*H04N 5/232* (2006.01)
*G03B 13/00* (2006.01)
*G03B 13/36* (2006.01)

(52) U.S. Cl.
CPC ............ *H04N 5/23296* (2013.01); *G03B 13/36* (2013.01); *H04N 5/23212* (2013.01)

(58) Field of Classification Search
CPC ... H04N 5/228; H04N 5/2356; H04N 5/2625; G02B 7/28; G02B 7/36; G03B 13/36
USPC ........................................ 348/222.1, 345, 349
See application file for complete search history.

(56) References Cited

U.S. PATENT DOCUMENTS

| 6,259,537 | B1 | 7/2001 | Matama |
| 6,373,992 | B1 | 4/2002 | Nagao |
| 2005/0046711 | A1* | 3/2005 | Morimoto .......... H04N 5/23296 348/240.2 |

(Continued)

FOREIGN PATENT DOCUMENTS

| FR | 2 949 003 A1 | 2/2011 |
| GB | 2 170 373 A | 7/1986 |

(Continued)

*Primary Examiner* — Kelly L Jerabek
(74) *Attorney, Agent, or Firm* — Drinker Biddle & Reath LLP

(57) ABSTRACT

A system for capturing sequences of digital images, including a lens, a digital sensor including a plurality of light-sensitive elements, a focusing module suitable for varying the focus of the lens on the sensor, and an electronic processing unit. The electronic processing unit is suitable for determining a variation in magnification between two consecutively captured digital images from a variation in the focus of the lens, and for determining a digital compensation for said variation in magnification. The electronic processing unit is further suitable for digitally processing at least one of the consecutively captured digital images on the basis of said predetermined compensation. The system enables compensation for visual effects resulting from changes in magnification between two consecutively captured images.

19 Claims, 2 Drawing Sheets

(56) References Cited

U.S. PATENT DOCUMENTS

| | | |
|---|---|---|
| 2008/0187302 A1 | 8/2008 | Okawara |
| 2008/0259176 A1* | 10/2008 | Tamaru ............... G03B 13/32 348/222.1 |
| 2009/0066832 A1 | 3/2009 | Hirasawa et al. |
| 2010/0097515 A1* | 4/2010 | Ishii ............... H04N 5/23219 348/349 |
| 2011/0128392 A1* | 6/2011 | Kumagai ............... G03B 5/00 348/208.5 |

FOREIGN PATENT DOCUMENTS

| | | |
|---|---|---|
| WO | WO 2006/095110 A2 | 9/2006 |
| WO | WO 2008/134234 A1 | 11/2008 |
| WO | WO 2011/018575 A1 | 2/2011 |

* cited by examiner

METHOD AND SYSTEM FOR CAPTURING SEQUENCES OF IMAGES WITH COMPENSATION FOR VARIATIONS IN MAGNIFICATION

CROSS-REFERENCE TO RELATED APPLICATIONS

This application is the U.S. national phase of the International Patent Application No. PCT/FR2012/052616 filed Nov. 13, 2012, which claims the benefit of French Application No. 11 60333 filed Nov. 14, 2011, the entire content of which is incorporated herein by reference.

BACKGROUND

The present invention relates to a method and a system for capturing sequences of images with different magnification values.

A system for capturing images (still or moving) can be a module suitable for use in a camera, a videocamera, a camera phone or videocamera phone (mobile phones that can capture photos or video), an endoscope, a surveillance camera, a toy, a personal digital assistant, a computer or a computer tablet, a thermal camera, an ultrasound or MRI (magnetic resonance imaging) device, an X-ray machine, etc.

Such an image capturing system conventionally comprises a sensor having a plurality of light-sensitive elements called pixels, which convert a received amount of light into digital values, and a lens unit for focusing the light on the sensor.

The sensor can be, for example, a CCD (Charged Coupled Device), a CMOS (Complementary Metal Oxide Semiconductor), a CID (Charge Induced Device), an IRCCD (Infra-Red CCD), an ICCD (Intensified CCD), an EBCCD (Electron Bombarded CCD), an MIS (Metal Insulator Semiconductor), an APS (Active Pixel Sensor), a QWIP (Quantum Well Infrared Photodetector), an MQA (Multiple Quantum Well), a sensor sensitive to the light spectrum and/or to other electromagnetic spectral bands, or some other type of sensor. It may possibly be associated with a Bayer or panchromatic filter in order to obtain a color image.

Image capturing systems are known that comprise a lens unit, a digital image sensor, and a focusing module.

"Lens unit" is understood to mean a unit comprising one or more elements which may be lenses, mirrors, and/or diffractive elements. The lens unit can be of fixed (without zoom capability) or variable focal length, meaning it includes a mechanism for changing the distance between the sensor and the lens unit in order to zoom in on the scene to be captured.

A variable focal length lens unit is generally more complex, cumbersome, and expensive than fixed focal length lens units. There are several kinds of variable focal length lens units, some maintaining the focus when changing the focal length, and others not maintaining the focus when changing the focal length (varifocal). The focal length of a variable focal length lens unit is usually chosen by the user. For example, the user may choose a short focal length (for example 24 mm focal length for a 24*36 mm$^2$ sensor) to capture a nearby monument, an average focal length for a portrait (for example a focal length of 100 mm for a 24*36 mm$^2$ sensor), and a long focal length to capture a distant object (for example a focal length of 200 mm for a 24*36 mm$^2$ sensor). The variation in focal length has the effect of causing a change in magnification of the digital image that is generally at the same proportions as the variation in focal length. The variation in focal length also has the effect of causing a distortion of the digital image that is distinct from the change in magnification. This distortion is not exactly the same throughout the digital image, due to the distortion from the lens unit which is a function of the focal length.

The focusing module allows varying the focus and is adapted for adjusting the system focus to obtain a sharp image of a portion of the image field. In the present description, the terms focusing and focus are used interchangeably. The focusing module can be manual or automatic, and in the latter case is called the autofocusing module. The focusing module is associated with a lens unit that is either variable focal length (with zoom capability) or fixed focal length (without zoom capability). A variation in focus corresponds to changing the blur spot, or in other words changing the size of the image of a point through the lens unit and on the sensor. Such a variation in focus can cause a variation in the magnification of the digital image that is generally much lower, although distinct and visible, than the variation in magnification produced by a change in the focal length of the lens unit. In the particular case of varifocal-type variable focal length lens units, the variation in focal length simultaneously produces a variation in focus and therefore, by varying the focal length, a first variation in magnification due to the variation in focal length and a second variation in magnification due to the variation in focus are achieved simultaneously. The variation in focus may result in a secondary local distortion of the digital image that is distinct from the variation in magnification. This distortion is not exactly the same throughout the digital image, due to the distortion of the lens unit which is a function of the focus.

The focusing can be managed by a "metering" system which may include a rangefinder, and/or by a phase-detection system which consists of diverting a portion of the luminous flux to two sensors and measuring the shift between the two images in order to determine the distance to the object. Such metering systems are cumbersome and expensive and are usually reserved for high-end devices.

In the absence of a metering system, the focus may be determined by successive iterations and relative measurements, running through different available configurations with the autofocusing module and measuring an image attribute such as contrast or sharpness in each of these configurations, for example for one of the color components in a color image. One example can be found in document FR-A-294 9003, which describes a system and method for capturing images with different modes of the autofocusing module.

Such focusing systems that use successive iterations are inexpensive and compact but have the disadvantage of slow focusing because they are iterative. In particular, when an image is out of focus, the autofocusing module does not know which way to adjust the focus of the lens unit before the first iteration.

When only capturing one image (a photograph of a scene), the image is typically captured after focusing. However, when capturing a sequence of images (video), a change in focus may occur between two successive images in a sequence. This produces a blurred image and a variation in magnification due to the variation in focus which is briefly visible on the screen of the device as well as in a video recording.

The invention relates more specifically to the capture of sequences of images of a scene with different magnifications from one image to another. "Magnification" is understood to mean the ratio between the size of the image of an object through the lens unit and the actual size of the object. A variation in magnification may be caused by changing the focal length of the lens unit when zooming in or out, or by changing the focus in a particular scene.

When changing the focus in a scene to be captured, a visual effect commonly known as lens breathing occurs, caused by the variation in magnification from one image to another in an image sequence. This visual effect can be particularly troublesome in certain applications, such as when capturing video image sequences for high definition applications and/or for 3D applications.

US-A-2009/0066832 describes a system for capturing a video image sequence, comprising a device which controls the speed of movement of the lens unit in a different manner depending on whether the image being captured is subject to magnification caused by electronic zoom. That patent proposes setting the autofocusing module to the magnification imposed by the zoom in order to lessen the visual effects of the zoom on the variations in sharpness. The system described in this document does not allow compensating for the visual effects of lens breathing.

WO-A-2008/134234 describes a system and method for capturing a video image sequence in which the images that are out of focus are rejected. Such a system requires a high capacity for capturing images, to allow discarding the blurred images with no significant loss of information.

US-A-2008/0187302 describes a system for capturing a video image sequence, comprising a second lens unit that applies an image correction in case of movement of a first lens unit. Such a system allows zooming in without affecting the focus of each image. Such a system with dual lens units is complex and expensive.

Some of the available "reflex" devices equipped with focusing systems based on phase detection, for example the Nikon D90®, disable the autofocusing module during image capture after focusing. Such a solution is not acceptable for capturing video image sequences because focus is no longer guaranteed if there is a change of scene.

More recently available "reflex" devices, such as the devices in the Sony® SLT series, keep the phase detection-based focusing system active when capturing a video sequence. However, the diverting of a portion of the luminous flux to the sensors of the focusing system decreases the light the image sensor is exposed to and may increase the noise in the captured images. In addition, these devices are subject to the lens breathing effects described above.

Embodiments of the invention eliminate some of the technical limitations described above. More specifically, the invention aims to compensate for the visual effects of lens breathing when capturing a sequence of images with variations in magnification, for example arising from variations in focus.

Embodiments of the invention provide rapid and continuous focusing for each image when capturing a sequence of images.

SUMMARY

To this end, the invention proposes a method for capturing a sequence of digital images, comprising the steps of:
  imaging a scene on a digital sensor, through a lens unit, with at least one first magnification value and at least one second magnification value, the second magnification value being different from the first magnification value and the variation between said magnification values arising from a variation in focus of the lens unit;
  capturing a first digital image with the first magnification value;
  capturing a second digital image with the second magnification value;
  determining a digital compensation for the variation between said magnification values;
  applying digital processing to the first digital image and/or to the second digital image, based on said determined digital compensation.

Depending on the embodiments, the method for capturing a sequence of digital images according to the invention may further comprise one or more of the following characteristics:
  one or more parameters of the digital compensation for the variation in magnification are predetermined by calibration;
  the digital compensation for the variation in magnification is determined based on digital analysis of the first digital image and/or of the second digital image;
  the digital processing consists of applying a corrective variation in magnification to the first digital image and/or to the second digital image, based on said determined digital compensation;
  the first digital image and the second digital image are two consecutive images in the sequence of digital images;
  the focus varies from one image to the next for each image in the capture of the sequence of images.

According to one embodiment, the method for capturing a sequence of digital images according to the invention further comprises a step of measuring a sharpness of each captured image, and the variation in focus from one image to another consists of oscillating about a current focus reference position, the current focus reference position being additionally adjusted according to the measured sharpness.

The method of the invention allows efficiently compensating for visual effects due to variations in magnification between two successively captured images. The method also ensures continuous focusing on the scene to be imaged, guaranteeing optimum sharpness of each of the captured images.

The invention further relates to a system for capturing sequences of digital images, comprising:
  a lens unit;
  a digital sensor comprising a plurality of light-sensitive elements;
  a focusing module suitable for varying the focus of the lens unit on the sensor;
  and
  an electronic processing unit,
  said electronic processing unit being adapted to determine:
  a variation in magnification between two successively captured digital images, arising from a variation in focus of the lens unit;
  a digital compensation for said variation in magnification;
  said electronic processing unit being further adapted to apply digital processing to at least one of the two successively captured digital images based on said determined compensation.

In some embodiments, the system for capturing a sequence of digital images according to the invention may further comprise one or more of the following characteristics:
  the lens unit is fixed focal length;
  the lens unit is variable focal length (varifocal);
  the electronic processing unit is suitable for determining the variation in magnification by digital analysis of at least one of the two successively captured digital images;
  the focusing module is an autofocusing module;
  the electronic processing unit is suitable for determining a change in position of the autofocusing module;
  a calibration table associating a position of the autofocusing module with a magnification value;

the electronic processing unit is further adapted for imposing a variation in focus between two successively captured digital images;

the electronic processing unit is adapted for imposing the variation in focus continuously during the capture of digital images;

the electronic processing unit is adapted for imposing the variation in focus by oscillating the position of the autofocusing module about a current reference position.

The system of the invention is inexpensive and compact, and can therefore be incorporated in small devices at a lower cost. Such a system still provides efficient compensation for visual effects due to changes in magnification between two successively captured images. The system also allows continuous variation in focus to ensure rapid focusing that is not visible to the user in the scene to be captured.

The invention is particularly applicable to consumer devices such as mobile phones, computers, cameras, videocameras, televisions, gaming consoles, and/or computer tablets which include a system for capturing images and/or sequences of images in digital form. The invention can also be applied in multi-camera systems, especially for 3D applications. The invention can also be applied in professional equipment such as medical imaging or video surveillance.

The invention also relates to a storage medium (hard disk, etc.) containing a sequence of images captured by the method of the invention.

BRIEF DESCRIPTION OF THE DRAWINGS

Other features and advantages of the invention will be apparent from the following description. It is purely illustrative and is to be read in conjunction with the accompanying drawings, in which.

DETAILED DESCRIPTION

Figure 1:
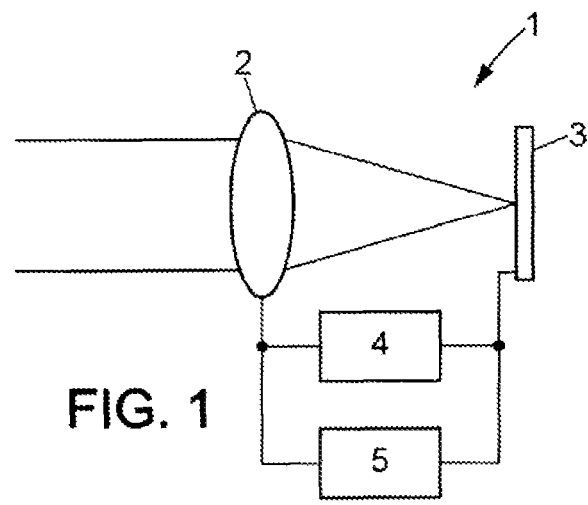
FIG. 1 is a diagram of an image capturing system according to an embodiment of the invention.

FIG. 1 represents a system 1 for capturing sequences of images according to one embodiment of the invention.

The system for capturing sequences of images 1 comprises a lens unit 2, a sensor 3, a focusing module 4, and an electronic processing unit 5. The system for capturing sequences of images 1 may include other known elements which will not be described in detail, for example memory and a means for transmitting the captured image. The "focusing module" will be referred to below as an "autofocusing module" 4, but it is understood that the invention also applies when the focusing module is purely manual.

The sensor 3 is provided with sensing elements for converting a flux of photons into an electrical signal. Depending on the embodiments concerned, the sensing elements of the sensor 3 may have black and white sensitivity, or sensitivity to two colors, three colors, or more.

The lens unit 2 comprises one or more elements among lenses, mirrors, and/or diffractive elements. In the context of the invention, the lens unit may be of variable focal length to allow the capture of images at different zoom values, or may be of fixed focal length. A system with a fixed focal length lens unit is better suited for inexpensive incorporation into a small device such as a mobile phone for example.

The system 1 also includes an autofocus module 4 adapted for changing the focus of the lens unit 2 on the sensor 3. The lens unit 2 of the system offers variable magnification, meaning the ratio between the size of the image of an object through the lens unit and the actual size of the object in the scene can vary, particularly due to the action of the autofocusing module 4, without this being caused by the object moving closer or further away.

A variation in focus can be obtained using an actuator based on technology such as voice coil, stepper motor, piezoelectric device, MEMS (Microelectromechanical systems), USM (Ultra Sonic Motor), or any other means for moving the lens unit and/or sensor, or for effecting movements of elements within the lens unit, or by using liquid lenses or any other electrical, mechanical, and/or magnetic means to alter the shapes and/or positions of the component elements of the lens unit, so that the sensor is in the focal plane of the image of the captured scene. The use of a liquid crystal phase modulator (LCPM) is another example of modifying the properties of the lens unit to change the magnification. In the invention, the position of the focusing or autofocusing device is any known setting, measurement, or magnitude associated with the focus, for example the physical position if there is movement, but also a current, a voltage, or a digital value, or the position with the best sharpness relative to the plane of the sensor.

It has been observed that a variation in focus can cause a variation in magnification of the object captured through the lens unit. Thus, when capturing a sequence of images, the magnification of the same object in the scene may be different from one image to another in the sequence, without this variation being caused by a change in the focal length of the lens unit. In particular, a variation in focus between two consecutive images, when focusing the system on the scene to be imaged, can induce a variation in magnification referred to as "lens breathing".

The image capturing system 1 of the invention thus allows capturing a first image with a first magnification value and a second image with a second magnification value, without the focal length of the lens unit 2 necessarily having been modified. For example, the variation in magnification between the two images may be due to a variation in focus in order to focus on the scene to be imaged.

The image capturing system 1 of the invention further comprises an electronic processing unit 5. The electronic processing unit 5 is able to associate each captured image with a magnification value. The electronic processing unit 5 is also able to differentiate whether a variation in magnification between the two captured images arises from a change in focal length of the lens unit 2 (a controlled zoom) or a change in focus in order to focus on the scene to be imaged. In particular, the extent of the at least one movement setting and/or the at least one movement measurement in the lens unit and/or sensor allows differentiating between a variation in focal length and a variation in focus. Typically, a variation in focus is achieved by relative movements of the lens unit/sensor of a few micrometers causing variations in magnification of about 1% to 5%, while a variation in focal length requires relative displacements of the lens unit/sensor of several millimeters which can cause variations in magnification of more than 300%.

The electronic processing unit 5 can be coupled to the autofocusing module 4, and can then determine the magnification values according to the position of the autofocusing module and a calibration table. Alternatively, the electronic processing unit 5 can be completely decoupled from the autofocusing module 4, and can then determine magnification values by digital analysis of the images, particularly by movement estimation methods known to those skilled in the art, such as correlations.

The electronic processing unit 5 is therefore adapted for determining a variation in magnification between two successive images in a sequence and for determining whether this variation is due to a cause other than a variation in focal length, particularly a variation in focus. The electronic processing unit 5 can then determine a digital compensation for the variation in magnification and can digitally process one and/or the other of the images in the sequence to compensate for the visual effect of the variation in magnification, in particular when varying the focus.

The electronic processing unit 5 may comprise software and/or hardware means to compensate for the visual effect of the variation in magnification, such as a digital zoom unit, and/or a graphics processor for applying deformations to ("warping") an image and/or a general processor and/or an image processor and/or a signal processor. The magnification compensation may comprise the application of a homography, each pixel of the processed digital image being obtained by bilinear or bicubic interpolation of pixels of the digital image to be processed.

Figure 2:
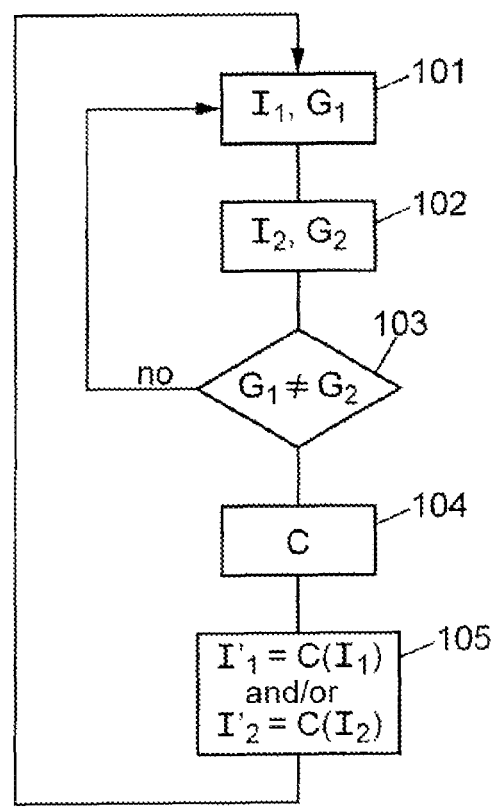
FIG. 2 illustrates the steps of the method for capturing images according to an embodiment of the invention.

The image capturing system 1 is adapted to implement the following steps, described with reference to FIG. 2.

The system captures a first digital image $I_1$ with a first magnification value $G_1$ (step 101). This first image $I_1$ is captured with a given position of the autofocusing module that corresponds to a given magnification $G_1$ between the size of the image $I_1$ through the lens unit and the actual size of the object in the scene.

The system captures a second digital image $I_2$ with a second magnification value $G_2$ (step 102). This second image $I_2$ is captured with a given position of the autofocusing module that corresponds to a given magnification $G_2$ between the size of the image $I_2$ through the lens unit and the actual size of the object in the scene.

The invention can be applied when the second magnification value $G_2$ is different from the first magnification value $G_1$ and more specifically when the variation between said magnification values $G_1$ and $G_2$ originates from a cause other than a variation in focal length of the lens unit, such as a variation in focus of the lens unit on the scene to be imaged. If the electronic processing unit of the system detects a difference between the magnification values $G_1$ and $G_2$ of two successively captured images (step 103), it determines a digital compensation C for the variation in magnification (step 104). How the electronic processing unit determines the digital compensation C is described in more detail below.

The electronic processing unit of the system then applies digital processing (step 105) to the first digital image and/or to the second digital image based on said determined compensation so that the variation between said magnification values is compensated for and becomes invisible or less visible. The first digital image $I_1$ can then be modified by digital processing after its capture to become a digital image $I_1'$ having a different magnification than the original image. The first processed digital image $I_1'$ is a result of applying the determined compensation C to the first image: $I_1'=C(I_1)$. Similarly, the second digital image $I_2$ may additionally or alternatively be modified by digital processing after its capture, into a digital image $I_2'$ having a different magnification than the original image. The second processed digital image $I_2'$ is a result of applying the determined compensation C to the second image $I_2'=C(I_2)$.

The digital compensation C applied to the first and/or second digital image $I_1$, $I_2$ allows compensating for the visual effects due to variations in magnification caused by variations in focus between the first image and the second image. This thus reduces or eliminates the effects of "lens breathing" when capturing a video image sequence. This digital compensation C is determined and the processing is applied continuously during capture of an image sequence as soon as a difference between the magnification values $G_1$ and $G_2$ of two successively captured images is detected (as illustrated by the returning arrows in the flowchart of FIG. 2).

Figure 3:
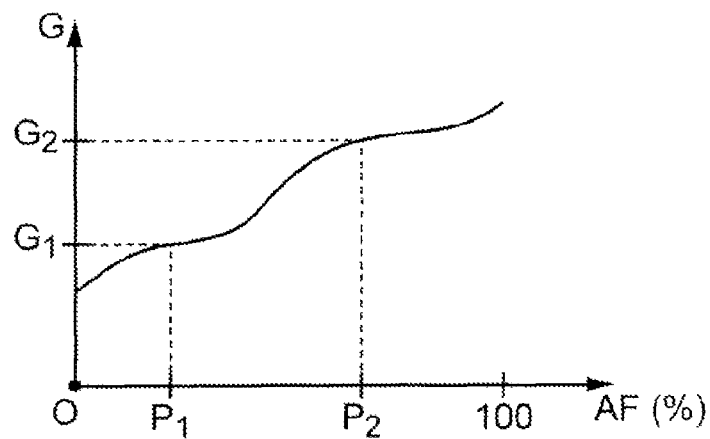
FIG. 3 schematically illustrates a calibration of the variations in magnification as a function of the position of the autofocusing module.

Digital compensation C for the variation in magnification between two successive images can be achieved in various ways. For example, one or more parameters of the digital compensation for the variation in magnification can be determined by calibration. The calibration consists of associating a magnification value, stored in a table of values, with each autofocus position. This association may for example be deduced from measurements or from the lens design. A calibration table can be included in the memory of the image capturing system. Such a calibration table can list the magnification values for each position of the autofocusing module. FIG. 3 illustrates such an embodiment: for the respective positions $P_1$, $P_2$ of the autofocusing module there are corresponding magnifications $G_1$, $G_2$. With such a calibration table, controlling the positions of the autofocusing module for each image allows determining the respective magnification values for each captured image. The digital magnification compensation C can then consist of applying a respective magnification $G_{REF}/G_1$, $G_{REF}/G_2$, thereby recreating images with a reference magnification $G_{REF}$. In another example, the calibration table can include the magnifications to apply for various positions $P_1$, $P_2$.

The digital compensation C can also be determined by digital analysis of the first digital image and/or digital analysis of the second digital image. For example, the variation in magnification between two images can be analyzed, for example by correlation. Such a correlation analysis may involve dividing the image into a plurality of blocks, calculating the local motion from one image to the next for each block, and calculating the model for the variation in magnification (homothetic transformation) in order to provide the best general explanation for the plurality of local motions. Other methods such as optical flow can also be used for digitally analyzing the variations in magnification between two images. In the case of a lens unit with variable focal length, it is necessary to remove the variation in magnification due to the variation in focal length. For example, the ratio of the magnification and the focal length is expected to be constant, meaning $G_1/f1=G_2/f2$, when $G_1$, f1, $G_2$, f2 respectively correspond to the magnification and focal length in the first and second images. This equation shows that a variation in magnification $(G_2/G_1)*(f1/f2)$ cannot be attributed to a change in focal length and can be compensated for, because it is interpreted as "lens breathing". Those skilled in the art will note that although it is difficult to be absolutely certain of the magnification, the variation in magnification $G_2/G_1$ can be determined by digital processing.

In some implementations, the digital compensation C can then be determined as the ratio between the magnification values $G_1$, $G_2$ of two successive images or as the average of this difference or as the weighted average of this difference or as the difference with a given fixed magnification value G. Once the digital compensation C is determined, the electronic processing unit can then process the first image to bring it substantially to the magnification of the second image or can process the second image to bring it substantially to the magnification of the first image, or can process each of the first and second images to bring both of them to a predetermined or median value. This digital processing after the images are captured allows compensating for the visual effects of "lens breathing" without requiring a complex lens unit and without affecting the image capture rate.

The digital compensation for variations in magnification between two successively captured images in a sequence also allows keeping the autofocusing module active during continuous acquisition of a sequence of digital images. In particular, it is possible to allow almost constant variations in focus on the scene to be captured in order to allow fast focusing during a scene change.

Indeed, as explained above, in a system which focuses by successive iterations, when an image is out of focus the system does not know which way to adjust the focus of the lens unit before the first iteration.

The invention proposes varying the focus position of the lens unit 2 between two successively captured digital images, with a variation that is less than or equal to a predetermined value: on the order of several microns. Such variations in the focus position of the lens unit allows continuously estimating the sharpness of the captured image and immediately determining the change to be made to the focusing of the lens unit during a scene change.

Figure 4:
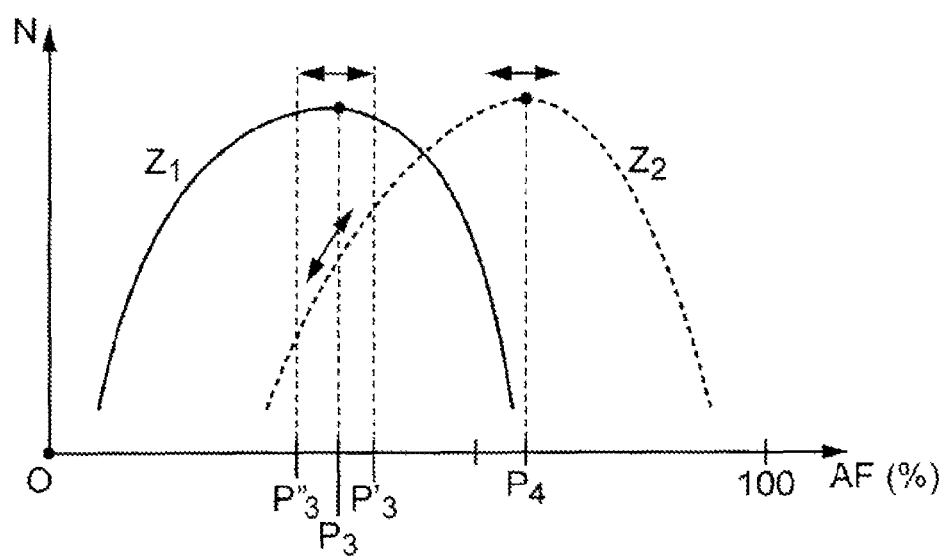
FIG. 4 schematically illustrates the variations in image sharpness as a function of the position of the autofocusing module.

FIG. 4 illustrates such an embodiment, with a graph that shows, for each scene, the sharpness of an image as a function of the position of the system's autofocus module. For a first given scene $Z_1$, an image will have its optimum sharpness at position $P_3$ of the autofocus module. For a second given scene $Z_2$, an image will have its optimum sharpness at position $P_4$ of the autofocus module. When the image capturing system passes from the first scene $Z_1$ to the second scene $Z_2$, the sharpness decreases abruptly although the position of the autofocusing module has not changed. To allow rapid focus adjustment during a scene change, the invention proposes controlled variations in focus around a current reference position. The current reference position is the position identified by the system as the one where the focus is optimum. A clear distinction will be made between the current position of the autofocus and the current reference position. The current reference position may be updated, for example if a position with better sharpness is found. Note, however, that it is often different from the current position of the autofocus, as the present invention proposes oscillating about the current reference position.

Thus, for the first scene $Z_1$, the position of the autofocusing module will oscillate between positions $P_3'$ and $P_3''$ about the current reference position $P_3$. The electronic processing unit determines the sharpness of the image for each oscillation position $P_3'$ and $P_3''$. The sharpness of each image can be measured by any known method. Therefore, as the captured scene corresponds to scene $Z_1$, the electronic processing unit determines that the positions $P_3'$ and $P_3''$ correspond to reduced sharpness compared to the current reference position $P_3$.

When the image capturing system passes from the first scene $Z_1$ to the second scene $Z_2$, the current reference position $P_3$ no longer corresponds to a position of optimum sharpness. By the change in sharpness measured during the oscillation between positions $P_3'$ and $P_3''$, the electronic processing unit is able to immediately determine that the scene has changed and in which direction to adjust the current position of the autofocusing module in order to quickly restore optimum sharpness in the second scene $Z_2$, update the current reference position, and then oscillate about the new current reference position of the autofocusing module. To regain optimum sharpness in the second scene $Z_2$ once the direction is determined, methods known to those skilled in the art may be employed, particularly the method of changing the position of the autofocus, measuring the sharpness relative to the previous image, and iterating until optimal sharpness.

In FIG. 4, scenes $Z_1$ and $Z_2$ are shown as being very different from each other to facilitate reading of the figure. However, when capturing a sequence of digital images, often the scene varies only slightly, for example due to movement of at least one object in the scene and/or movement of the user of the image capturing system, and the current reference position of the autofocus is no longer the position of maximum sharpness. The continuous oscillation between positions $P_3'$ and $P_3''$ about the current reference position $P_3$ allows detecting these situations in order to optimize the sharpness of the captured images. This provides an instant response, while in a traditional system, in order to avoid lens breathing effects, a significant variation in sharpness is expected, for example for several hundred milliseconds, before the position of the focusing device is adjusted.

The variations in the position of the autofocusing module about the current reference position are forced, meaning they are imposed by the electronic processing unit of the image capturing system without being needed in order to bring the image into focus. The variations in the position of the autofocusing module about the current reference position are continuous, meaning they are not discontinued when capturing a sequence of digital images.

These variations in the position of the autofocusing module are of limited amplitude to minimize the visual impact on the captured images, while being large enough to allow measuring the relative sharpness. For example, oscillations on the order of 10 microns about the current reference position allow an algorithm to measure a change in sharpness without this change being visible to the eye. The electronic processing unit can also process the captured images to compensate for variations in sharpness, for example by applying enhancement filters whose intensity is adapted to the change in focus. In another embodiment, the details of the sharper image can be transposed onto the hazier image, by copying the result of the sharper image through a high-pass filter onto the more blurry image. The processing unit may also digitally process the captured images to compensate for variations in lens unit distortion when varying the position of the autofocusing module, for example by locally warping the image to remove distortions based on a distortion field measured by calibration for different values for the focus and focal length.

The variations in the position of the autofocusing module cause variations in focus which may cause variations in magnification between successive captured images. These variations in magnification can be compensated for by the method of the invention described above.

The present invention thus keeps the autofocus active when capturing a sequence of images in order to ensure rapid focusing during a scene change, while eliminating the visual effects of lens breathing and while retaining all captured images to allow fluid delivery of videos.

The invention can be applied to any image capturing system, but more specifically to a consumer device and/or a device of small dimensions which is to be used to capture video sequences, such as a mobile phone, a computer, a camera, a gaming console, or a computer tablet. The invention can also be applied in professional devices such medical imaging or video surveillance devices, in camcorders or reflex cameras, as well as in multi-camera systems for capturing video to be reconstructed into three-dimensional scenes. The invention also covers any storage medium (hard disk or the like) containing a sequence of images captured by the method of the invention.

The invention claimed is:

1. A method of capturing a sequence of digital images, the method comprising:
    imaging a scene on a digital sensor, through a lens unit, with at least one first magnification value and at least one second magnification value, the second magnification value being different from the first magnification value and a variation between said magnification values arising from a variation in focus of the lens unit, the magnification values corresponding to a ratio between a size of the image of an object through the lens unit and an actual size of the object;
    capturing a first digital image with the first magnification value;
    capturing a second digital image with the second magnification value;
    determining a digital compensation for the variation between said magnification values;
    applying digital processing to the first digital image and/or to the second digital image, based on said determined digital compensation.

2. The method of claim 1, wherein one or more parameters of the digital compensation for the variation in magnification are predetermined by calibration.

3. The method of claim 1, wherein the digital compensation for the variation in magnification is determined based on digital analysis of the first digital image and/or of the second digital image.

4. The method of claim 1, wherein the digital processing comprises applying a corrective variation in magnification to the first digital image and/or to the second digital image, based on said determined digital compensation.

5. The method of claim 1, wherein the first digital image and the second digital image are two consecutive images in the sequence of digital images.

6. The method of claim 1, wherein the variation in focus of the lens unit is from one image to the next for each image in the capture of the sequence of images.

7. The method of claim 6, further comprising measuring a sharpness of each captured image, and wherein the variation in focus from one image to another comprises oscillating about a current focus reference position, the current focus reference position being additionally adjusted according to the measured sharpness.

8. A system for capturing sequences of digital images, the system comprising:
    a lens unit;
    a digital sensor comprising a plurality of light-sensitive elements; and
    a processor, wherein the processor is configured to control a variation of the focus of lens unit on the sensor,
    the processor being adapted to determine:
        a variation in magnification between a first and second captured digital images, the variation in magnification arising from a variation in focus of the lens unit;
        a digital compensation for said variation in magnification, the magnification corresponding to a ratio between a size of the image of an object through the lens unit and an actual size of the object; and
    the processor being further adapted to apply digital processing to at least one of the two captured digital images based on said determined compensation.

9. The system of claim 8, wherein the lens unit has a fixed focal length.

10. The system of claim 8, wherein the lens unit has a variable focal length.

11. The system of claim 8, wherein the processor is suitable for determining the variation in magnification by digital analysis of at least one of the two captured digital images.

12. The system of claim 8, wherein the processor configured to control the variation of the lens unit on the sensor via an autofocusing module.

13. The system of claim 12, wherein the processor is suitable for determining a change in position of the autofocusing module.

14. The system of claim 13, further comprising a calibration table associating a position of the autofocusing module with a magnification value.

15. The system of claim 12, wherein the processor is further adapted for imposing a variation in focus between two successively captured digital images.

16. The system of claim 15, wherein the processor is adapted for imposing the variation in focus continuously during the capture of digital images.

17. The system of claim 15, wherein the processor is adapted for imposing the variation in focus by oscillating the position of the autofocusing module about a current reference position.

18. A portable device comprising a system for capturing sequences of digital images, wherein said system comprises:
    a lens unit;
    a digital sensor comprising a plurality of light-sensitive elements; and
    a processor, wherein the processor is configured to control a variation of the focus of the lens unit on the sensor;
    said processor being adapted to determine:
        a variation in magnification between a first and second captured digital images, the variation in magnification arising from a variation in focus of the lens unit, the magnification corresponding to a ratio between a size of the image of an object through the lens unit and an actual size of the object;
        a digital compensation for said variation in magnification; and
    said processor being further adapted to apply digital processing to at least one of the two captured digital images based on said determined compensation.

19. The portable device of claim 18, embodied as one of a mobile phone, a computer and a digital tablet.

* * * * *